United States Patent
Bodas et al.

(10) Patent No.: US 6,189,608 B1
(45) Date of Patent: Feb. 20, 2001

(54) COOLING APPARATUS WITH AUTOMATIC LOUVRE OPERATING MECHANISM

(75) Inventors: Janos Bodas; Janos Guba, both of Budapest (HU)

(73) Assignee: Energiagazdalkodasi Resvenytarsasag, Budapest (HU)

(*) Notice: Under 35 U.S.C. 154(b), the term of this patent shall be extended for 0 days.

(21) Appl. No.: 09/147,098

(22) PCT Filed: Feb. 11, 1998

(86) PCT No.: PCT/HU98/00015
§ 371 Date: Oct. 5, 1998
§ 102(e) Date: Oct. 5, 1998

(87) PCT Pub. No.: WO98/35198
PCT Pub. Date: Aug. 13, 1998

(30) Foreign Application Priority Data

Feb. 11, 1997 (HU) .................................... 9700416

(51) Int. Cl.⁷ .............................. F28F 27/00; F01P 7/10; G05D 23/00
(52) U.S. Cl. .............................. 165/300; 165/98; 165/96; 165/299
(58) Field of Search .............................. 165/98, 299, 96, 165/300; 123/41.04, 41.05, 41.06

(56) References Cited

U.S. PATENT DOCUMENTS

| | | | |
|---|---|---|---|
| 1,219,516 | * 3/1917 | Whittelsey | 165/300 |
| 1,368,673 | * 2/1921 | Willis | 123/41.05 |
| 1,471,510 | * 10/1923 | Willis | 123/41.05 |
| 1,523,541 | * 1/1925 | Irving | 123/41.06 |
| 1,542,407 | * 6/1925 | Raleigh | 123/41.05 |
| 1,619,621 | * 3/1927 | Lovejoy | 165/98 |
| 1,817,398 | * 8/1931 | See | 123/41.04 |
| 1,949,009 | * 2/1934 | Dintilhac | 123/41.04 |
| 3,635,284 | * 1/1972 | Hoch | 165/300 |
| 3,710,765 | * 1/1973 | Dorsch | 123/41.05 |
| 4,403,649 | * 9/1983 | Herschel et al. | 165/101 |
| 4,512,393 | * 4/1985 | Maendel | 165/96 |

* cited by examiner

*Primary Examiner*—Ira S. Lazarus
*Assistant Examiner*—Tho Duong
(74) *Attorney, Agent, or Firm*—Dickinson Wright PLLC

(57) ABSTRACT

A cooling apparatus comprising an air-cooled heat exchanger, a plurality of louvres to control a cooling air flow passing the heat exchanger, a mechanism for operating the louvres and means for actuating the operating mechanism according to temperature of the heat exchanger. The actuating means comprises a bar having a first end and a second end and being of a material having a considerably lower thermal expansion coefficient than that of the heat exchanger, said bar being attached by its first end substantially at a first end of the heat exchanger, and means for controlling the position of the operating mechanism in dependence on a difference in displacements of the second end.

20 Claims, 4 Drawing Sheets

COOLING APPARATUS WITH AUTOMATIC LOUVRE OPERATING MECHANISM

TECHNICAL FIELD

The invention relates to a cooling apparatus comprising an air-cooled heat exchanger, a plurality of louvres to control a cooling air flow passing the heat exchanger, a mechanism for operating the louvres and means for actuating the operating mechanism according to temperature of the heat exchanger.

BACKGROUND ART

In the industry and at power stations, cooling apparatuses, in which the medium to be cooled can be of a liquid or vaporous phase, are well known.

The known cooling apparatuses primarily used in large-size cooling systems of power stations comprise an air-cooled heat exchanger having a plurality of finned tubes connected in parallel, a plurality of air-side louvres, a mechanism for operating the louvres and means for actuating the operating mechanism according to temperature of the heat exchanger.

According to the current practice, the purpose of louvres used in cooling apparatuses is to control heat dissipation and to provide frost protection of heat exchangers. In the case of power station cooling apparatuses, controlling of heat dissipation is a secondary function, proven by the fact that louvres are generally not applied under climatic conditions where no frost risk prevails.

However, frost protection is extremely important because the finned tubes represent extremely large air side heat transfer surface, and heat dissipation is significant under air flow conditions. Thus, if the medium flowing in the finned tubes is overcooled or its flow stops, the medium could freeze within 1 to 2 minutes, leading to serious damage of the heat exchanger. By closing the louvres, the flow of cooling air can be reduced or totally stopped, thereby freezing can be avoided.

The number and size of louvres used in power station practice vary in an extremely wide range. As an example, in the case of a cooling tower associated with a 200 MW steam turbine, approximately 120 heat exchanger units, each having 60 louvres of 2.5×0.25 m size are required. The louvres are rotatably mounted adjacent to each other on frames in front of the heat exchangers in the direction of the cooling air flow.

In the current practice, these louvres are actuated by an electric motor or by hydraulic or pneumatic systems. The actuator is linked to the louvres by an operating mechanism, preferably a linkage of bars. In order to ensure a reliable protection of high value heat exchangers, a large number of temperature sensors, an associated transmitter and cable system as well as electric or electronic control equipment have to be used.

For ensuring a reliable protection complicated and costly detector and control system is required because it is difficult to identify unambiguously the temperature of medium flowing in heat exchangers. This depends on the location of the relevant finned tube in relation to the air flow direction, on the uniformity of the distribution of the medium to be cooled and also on other factors. Since the purpose of louvres is to ensure frost protection of heat exchangers, within a given group of finned tubes always the lowest temperature is to be determined for the medium, and the louvres are to be operated accordingly.

Another drawback of the known solutions is that it is difficult to ensure that the power required for operating the louvres is safely available, because the most critical condition from the aspect of frost risk could arise exactly at the time of operational disturbances and power breakdowns.

DISCLOSURE OF INVENTION

The object of the invention is to create a cooling apparatus having a simple and cost efficient louvre actuating, which also ensures safe operation on critical conditions.

The basic principle of the louvre actuating of the cooling apparatus according to the invention is that the actuating is carried out by a properly designed mechanism operated or controlled by the thermal expansion of the finned tubes of the heat exchanger and that of the frame. Thereby, the safety of operation does not depend on an external power supply.

In the case of aluminium finned tubes, because the aluminium's thermal expansion coefficient is high and because long finned tubes of 15 to 25 m length are involved, thermal expansion could even reach 10 to 20 mm under normal operating conditions. By means of the mechanism to be described later, it can be ensured that if the medium approaches a dangerously low temperature from the aspect of freezing, e.g. +10° C., the louvres are closed as a result of the contraction of the finned tubes, and when reaching the operating temperature, e.g. +45 to +50° C., the finned tubes expand and the louvres are fully open.

Thus, the invention is a cooling apparatus comprising an air-cooled heat exchanger, a plurality of louvres to control a cooling air flow passing the heat exchanger, a mechanism for operating the louvres and means for actuating the operating mechanism according to temperature of the heat exchanger, wherein the actuating means comprise a bar having a first end and a second end and being of a material having a considerably lower thermal expansion coefficient than that of the heat exchanger, said bar being attached by its first end substantially at a first end of the heat exchanger, and means for controlling the position of the operating mechanism in dependence on a difference in displacements of the second end of the bar and a second end of the heat exchanger due to the thermal expansion of the bar and that of the heat exchanger.

In this way a simple and cost efficient louvre actuating is achieved, which can be fitted on each heat exchanger of a cooling tower, and thereby the heat exchangers close or open the associated louvres independently of each other as a function of the temperature of the medium flowing in them. Thus, regardless of wind direction and a non-uniform distribution of the medium flowing in the heat exchangers, each heat exchanger of a cooling tower can safely be protected from freezing.

The heat exchanger preferably comprises upward finned tubes, said first end of the heat exchanger is at bottom ends of the finned tubes and the bar is arranged substantially parallel to the finned tubes.

In a preferred embodiment the heat exchanger is made of aluminium and the bar is made of invar alloy having practically zero thermal expansion coefficient. In this way the displacement difference will be relatively high.

The louvres are preferably rotatably mounted adjacent to each other on a frame placed in front of the heat exchanger in the direction of the air flow and the operating mechanism is a linkage of bars comprising an operating bar and rotating arms connected to the louvres.

Preferably, the linkage of bars further comprises a linkage head hinged to the operating bar, said linkage head comprising a slot for a bolt connecting the controlling means and the linkage of bars, said slot allowing further displacement of the bolt in a direction corresponding to a closing of the louvres after the louvres have reached their closed end position.

In another preferred embodiment the frame comprises a limit stop for the linkage of bars to stop an opening of the louvres at an opened end position, and in the linkage head there is a spring support for the bolt for allowing further displacement thereof in a direction corresponding to the opening of the louvres after the louvres have reached their opened end position.

The controlling means are preferably a two-armed controlling lever rotatably fixed by a bolt in a support attached to the second end of the heat exchanger, the controlling lever being hinged with its first arm to the second end of the bar and with its second arm to the operating mechanism.

The cooling apparatus preferably further comprises means for adjusting the control of the operating mechanism according to ambient temperature conditions. In this preferred embodiment the frame is fixed substantially at the first end of the heat exchanger, the controlling means are a two-armed controlling lever supported by a roller on a support attached to the second end of the heat exchanger, the adjusting means are a two-armed adjusting lever rotatably fixed by a bolt in the second end of the bar, where the controlling lever is hinged with its first arm to a first arm of the adjusting lever and with its second arm to the operating mechanism, and the adjusting lever is hinged with its second arm to the frame substantially at the second end of the heat exchanger.

In a further preferred embodiment the controlling means comprise a hydraulic servo device for controlling the position of the operating mechanism according to said displacement difference, the servo device being powered by a pressure difference of a medium to be cooled in the heat exchanger, wherein the hydraulic servo device is attached to the frame substantially at the second end of the heat exchanger and comprises a control valve and a piston device, the control valve controlling a flow of the medium from a higher pressure portion of the apparatus through the piston device and a throttle device via pipes to a lower pressure portion of the apparatus according to said displacement difference, the piston device having a piston rod connected to the operating mechanism.

In another preferred embodiment the finned tubes are arranged in parallel between a lover collecting chamber and an upper collecting chamber, the first end of the bar is attached to a support for the heat exchanger, the louvres are mounted on the frame in a way that their weight being operative in closing the louvres, and the frame is made of steel.

BRIEF DESCRIPTION OF DRAWINGS

The invention will hereinafter be described on the basis of preferred embodiments depicted by the drawings, where.

BEST MODES FOR CARRYING OUT THE INVENTION

Figure 1:
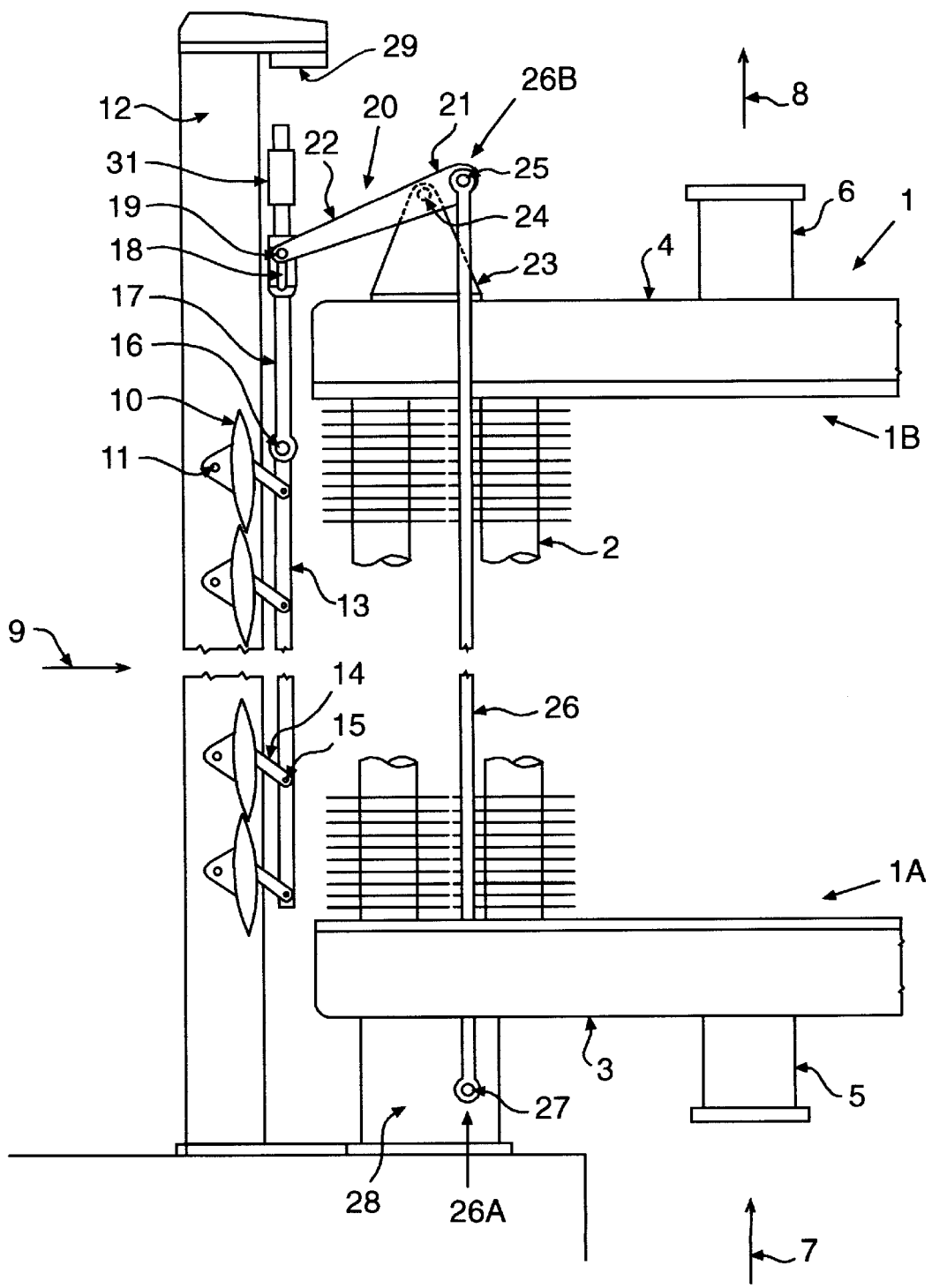
FIG. 1 is a schematic view of a preferred embodiment of the cooling apparatus according to the invention.

In FIG. 1 an air cooled heat exchanger 1 having a lower end 1A and an upper end 1B comprises aluminium finned tubes 2 connected vertically in parallel between a lower collecting chamber 3 and an upper collecting chamber 4. The heat exchanger 1 is fixed at its lower end 1A to a support 28. The medium to be cooled, preferably water, enters the lower collecting chamber 3 from the direction of an arrow 7, through a pipe stub 5, and leaves the upper collecting chamber 4 through a pipe stub 6 in the direction of an arrow 8. Of course, the flow of the medium may be designed differently. A cooling air flow 9 flows perpendicular to the finned tubes 2.

The temperature of finned tubes 2 corresponds to the temperature of the medium flowing in the heat exchanger 1, because the finned tubes 2 made of aluminium practically assume the temperature of the medium flowing therein.

For the frost protection of the heat exchanger 1, louvres 10 are provided, which are rotatably mounted by bolts 11 on a frame 12 placed in front of the heat exchanger 1 in the direction of the air flow 9. Since the axis of bolts 11 is not aligned with the centre of gravity of the louvres 10, the louvres 10 close under their own weight, if not actuated. Of course, closing of the louvres 10 can be accomplished in different ways, for example by a spring mechanism.

The louvres 10 are arranged in a way that in the closed position shown in FIG. 1 the edges of adjacent louvres 10 abut on each other. In this way the louvres 10 can not turn over, and so a closed end position for the louvres 10 is ensured.

Figure 2:
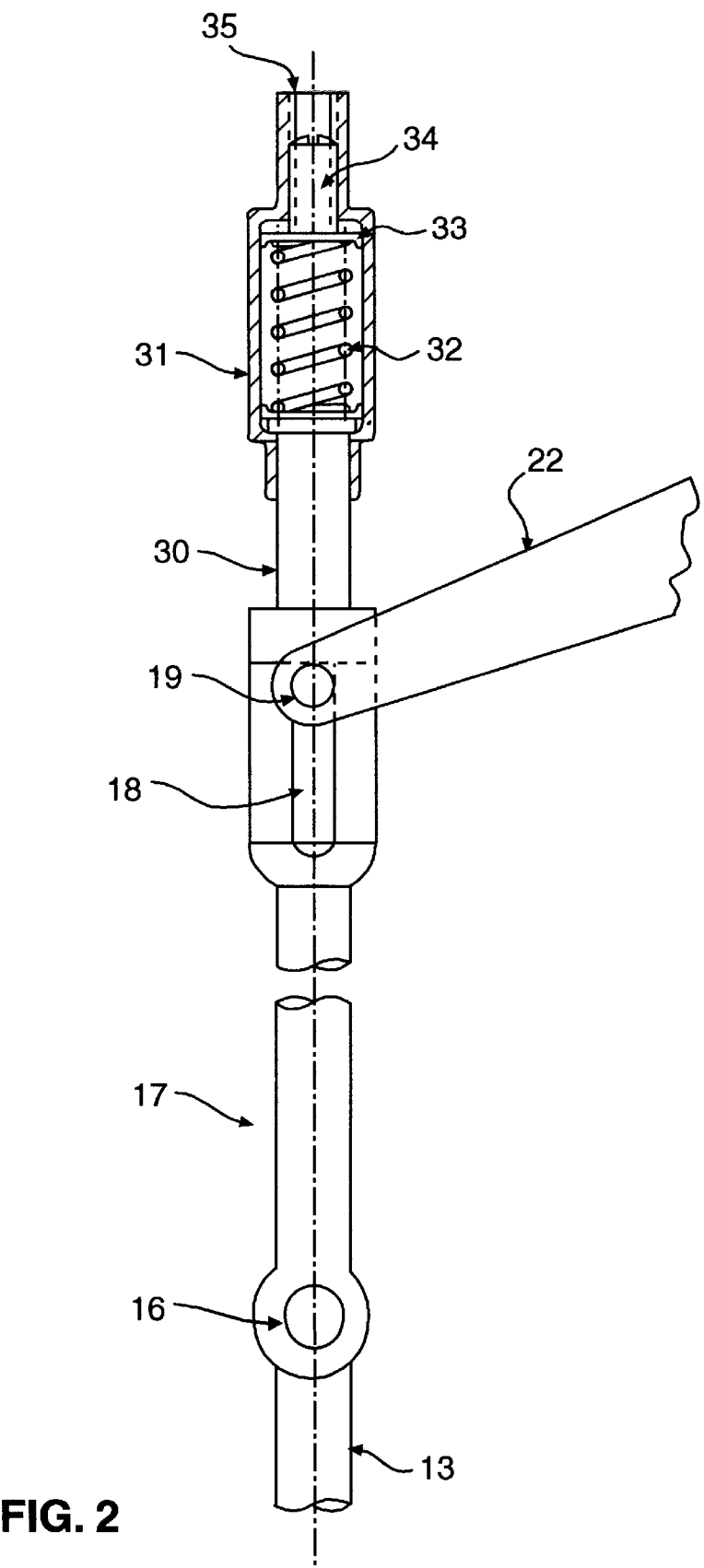
FIG. 2 is a schematic view of a part of the cooling apparatus in FIG. 1, partly in cross-section.

The louvres 10 can be actuated by means of a linkage of bars comprising rotating arms 14 connected by bolts 15 to an operating bar 13. The upper end of the operating bar 13 is hinged by a bolt 16 to a linkage head 17 depicted in FIG. 2 in a more detailed manner. There is a controlling lever 20 rotatably fixed by a bolt 24 in a support 23 attached to the upper collecting chamber 4 of the heat exchanger 1, said lever 20 having a first arm 21 and a second arm 22. The linkage head 17 is hinged by a bolt 19 to the second arm 22 of the controlling lever 20. The first arm 21 of the controlling lever 20 is attached to one end 26B of a bar 26 by a bolt 25. The bar 26 is of a material having a considerably lower thermal expansion coefficient than that of the finned tubes 2, preferably it is of invar alloy. Another end 26A of the bar 26 is attached to the support 28 by a bolt 27. In the embodiment shown the one end 26B of the bar 26 is its upper end and the other end 26A of the bar 26 is its lower end.

As the bar 26 in the preferred embodiment is of invar alloy with a negligible thermal expansion coefficient, the position of its upper end 26B practically does not depend on temperature. In the case of a change in the temperature of the medium in the finned tubes 2, the length of finned tubes 2 changes, and with this the vertical position of collecting chamber 4 and, therefore, that of the bolt 24 in support 23 also varies. In case the temperature of the medium increases, bolt 24 moves upwards, and so controlling lever 20 moves the linkage of bars upwards, thereby opening the louvres 10. Accordingly, if the temperature of the medium drops, the louvres 10 rotate in direction of closing. In this way the louvres 10 are actuated according to an average temperature of the medium in finned tubes 2 of the heat exchanger 1.

In power station applications, it is generally advisable to adjust the above mechanism in a way that in the case of +10° C. temperature of the medium in the finned tubes 2 the louvres 10 are in their closed end position, and at +45 to +50° C. they are in their opened end position.

In a drained state of the heat exchanger 1 the finned tubes 2 assume the ambient temperature, i.e. they could even cool down to −20 to −40° C. In this case free turning of controlling lever 20 in the direction corresponding to the closing of the louvres 10 must be ensured even after the louvres 10 have reached their closed end position. This is ensured by a slot 18 in the linkage head 17 for the bolt 19.

Similarly, the heat exchanger 1 may be at a temperature higher than necessary for the full opening of the louvres 10, e.g. higher than +50° C. To make sure that the louvres 10 are not rotated beyond the opened end position, a limit stop 29 fixed to the frame 12 is provided, which stops the linkage head 17 by impacting with an upper surface 35 thereof, and so a further movement of the louvres 10 in the direction of opening is not possible. At the same time, the controlling lever 20 must be able to move upwards, in case of further increase of the temperature. This movement is enabled by a connecting element 30 and a pre-tensioned spring 32 arranged in a socket 31. The connecting element 30 may be displaced upwards in case the force resulting from the thermal expansion is higher then the pre-set force of the spring 32. The pre-tensioning of the spring 32 is provided by a spring cup 33 and a screw bolt 34.

The linkage head 17 not only ensures further turning of the controlling lever 20 after reaching the end positions of the louvres 10, but it also protects the above mechanism in any position against overloading, i.e. against an-eventual distortion or breakage.

Figure 3:
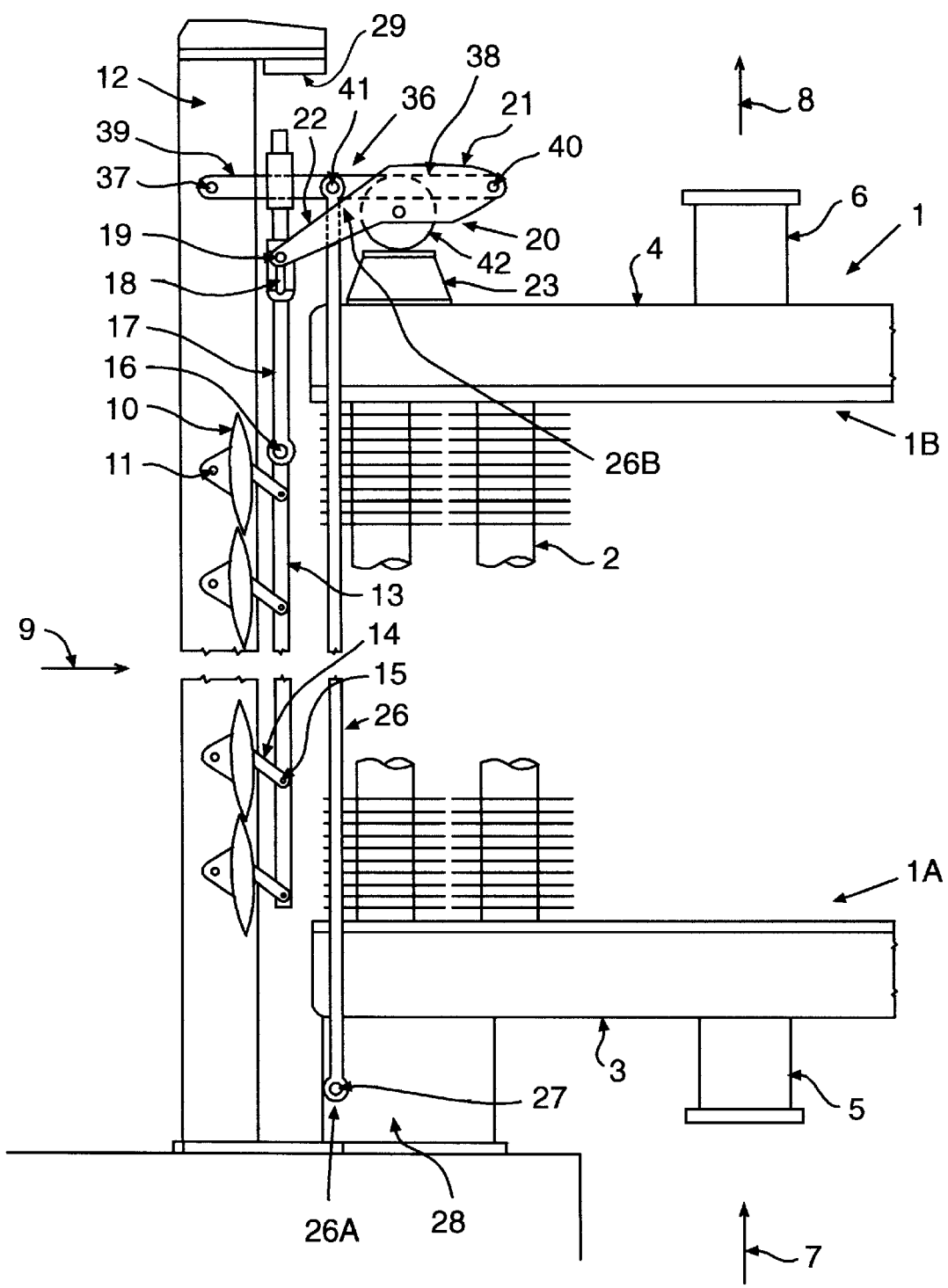
FIG. 3 is a schematic view of another preferred embodiment of the cooling apparatus according to the invention having adjusting means.

A further embodiment of the invention is shown in FIG. 3. This embodiment ensures adjusting the actuation of the louvres 10 according to ambient temperature conditions. The two-armed controlling lever 20 is supported by a roller 42 on the support 23. The adjustment is ensured by a two-armed adjusting lever 36 rotatably attached by a bolt 41 in the upper end 26B of the bar 26, where the controlling lever 20 is hinged with its first arm 21 to a first arm 38 of the adjusting lever 36 by a bolt 40 and with its second arm 22 to the linkage of bars by the bolt 19. The adjusting lever 36 is hinged with its second arm 39 to the frame 12 by a bolt 37 practically at the level of the upper end 1B of the heat exchanger 1.

Since the air flow 9 enters the heat exchanger 1 in the direction of its arrow, the frame 12 is practically always at the same temperature as that of the ambient air. With an increasing ambient air temperature, position of bolt 37 rises, and since the length of the bar 26 practically does not change as a function of temperature, bolt 41 stays where it is, consequently bolt 40 moves downwards, bolt 19 is displaced upwards, and so the louvres 10 are opened. Therefore, in the case of higher ambient air temperatures, the full opening of the louvres 10 is ensured already at lower temperatures of the medium in the finned tubes 2.

When the ambient temperature drops, the displacements take place in the other direction. Consequently, the closing of the louvres 10 occurs already at a higher medium temperature.

By the latter embodiment safety of the cooling apparatus against freezing can be greatly increased, because as the ambient air temperature decreases, the temperature of the medium flowing in the heat exchanger 1 at which the louvres 10 are closed for frost protection increases. In hot weather, however, full opening of the louvres 10 is ensured already at a lower temperature of the medium, which improves the efficiency of cooling.

The adjustment of actuation of the louvres 10 as a function of ambient air temperature can also be provided by a solution other than the thermal expansion of the frame 12, for example by converting a pressure of an evaporating medium located in the air flow 9 into a displacement, by means of a diaphragm or a piston.

Figure 4:
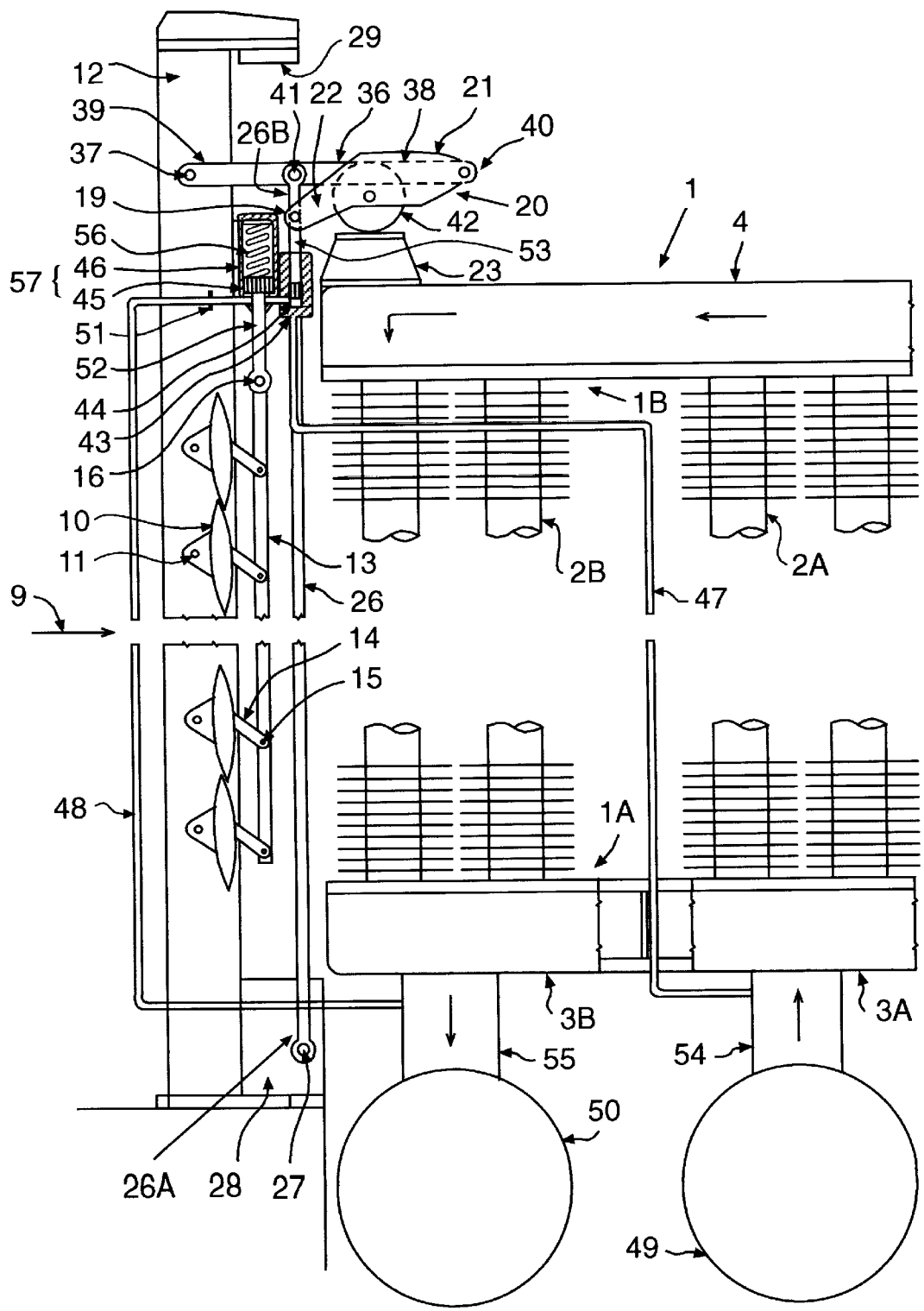
FIG. 4 is a schematic view of a further preferred embodiment of the cooling apparatus according to the invention having a hydraulic servo device.

In FIG. 4 a further preferred embodiment of the invention is shown, wherein the controlling of the position of the linkage of bars is accomplished by a hydraulic servo device powered by a pressure difference of the medium to be cooled in the heat exchanger 1.

In this embodiment there are two lower collecting chambers 3A and 3B separated from each other. The medium to be cooled flows from a main forward pipe 49 via an inlet pipe stub 54 into the first lower collecting chamber 3A. Through finned tubes 2A connected to the first lower collecting chamber 3A the medium flows to the upper collecting chamber 4. From the upper collecting chamber 4 through finned tubes 2B connected to the second lower collecting chamber 3B the medium flows into the second lower collecting chamber 3B, and from there into a main return pipe 50 via an outlet pipe stub 55.

The hydraulic servo device is attached to the frame 12 substantially at the upper end 1B of the heat exchanger 1 and comprises a control valve 43 and a piston device 57. The piston device 57 has a cylinder 46 and a piston 45 with a piston rod 52 connected to the operating bar 13 by the bolt 16.

In this embodiment, shown only as an example, the control valve 43 controls a flow of the medium from the inlet pipe stub 54 via a first pipe 47 through the piston device 57 and a throttle device 51 via a second pipe 48 to the outlet pipe stub 55, wherein the pressure in the outlet pipe stub 55 is less than the pressure in the inlet pipe stub 54. The flow of the medium in the pipes 47, 48 can be adjusted by the throttle device 51. The steady flow prevents freezing or solidifying of the medium in the hydraulic servo device.

Again, the two-armed controlling lever 20 is supported by the roller 42 on the support 23. The adjustment is ensured by the two-armed adjusting lever 36 rotatably fixed by the bolt 41 in the upper end 26B of the bar 26, wherein the controlling lever 20 is hinged with its first arm 21 to the first arm 38 of the adjusting lever 36 and with its second arm 22 to a control rod 53 of the control valve 43. As it is apparent in FIG. 4, the bar 26 is leaded behind the control valve 43. The adjusting lever 36 is hinged with its second arm 39 to the frame 12 practically at the level of the upper end 1B of the heat exchanger 1.

In this way the difference in thermal expansions of the bar 26 and the heat exchanger 1 is coupled to the control rod 53 of the control valve 43. When the control rod 53 moves upward, the control valve 43 opens the way of the medium through an opening 44 into the cylinder 46 of the piston device 57. The piston rod 52 attached to the piston 45 of the piston device 57 then moves upward and opens the louvres 10. In the case when the control rod 53 moves downward, the control valve 43 closes the way of the medium and as a consequence, piston rod 52 moves downward due to the weight of the louvres 10 and by the effect of a spring 56 arranged in the cylinder 46, and the louvres 10 close.

The above arrangement of the hydraulic servo device ensures that in case when the cooling apparatus is drained, all parts of the hydraulic servo device drain automatically. In this case the pressure of the medium ceases and the louvres 10 move in the direction of the closed end position.

The preferred embodiments described above can be primarily used in large-size cooling systems of power stations, where the medium in the heat exchangers is water or steam condensate, and furthermore the cooling surface of the heat exchanger is made of metal, primarily aluminium or aluminium-alloy. However, the invention also covers cooling apparatuses having a size, medium and material different from the embodiments used as an example.

The arrangement and the implementation of elements of the cooling apparatus according to the invention can also differ from those of the described embodiments. For example, it is possible to arrange the controlling lever or the hydraulic servo device substantially at the lower end of the heat exchanger, and to fix the upper end of the bar substantially at the upper end of the heat exchanger. The operating means can also be a rack-and-pinion gear.

It will be evident to those skilled in the art that the above disclosure is exemplary only and that various other alternatives, adaptations and modifications may be made within the scope of the present invention as defined by the following claims.

What is claimed is:

1. A cooling apparatus comprising:
an air-cooled heat exchanger having a first end and a second end with a plurality of finned tubes extending substantially between the first and second ends, a plurality of louvres for controlling a cooling air flow passing the heat exchanger, said cooling apparatus having a mechanism for operating the louvres according to the temperature of the finned tubes, said mechanism comprising a bar having a first end and a second end and being of a material having a substantially lower thermal expansion coefficient than that of the finned tubes, said bar being attached by its first end substantially at said first end of the heat exchanger, wherein the position of the louvres is dependent on a difference in displacements of the second end of the bar and the second end of the heat exchanger due to the thermal expansion of the bar and that of the finned tubes.

2. The apparatus according to claim 1, wherein said first end of the heat exchanger is at bottom ends of the finned tubes and the bar is arranged substantially parallel to the finned tubes.

3. The apparatus according to claim 2, wherein the finned tubes are made of aluminum and the bar is made of invar alloy.

4. The apparatus according to claims 2 or 3, wherein the finned tubes are arranged in parallel manner between a lower collecting chamber and an upper collecting chamber, and the first end of the bar is attached to a support for the heat exchanger.

5. The apparatus according to claim 1, wherein said operating mechanism comprises a two-armed controlling lever rotatably fixed by a bolt in a support attached to the second end of the heat exchanger, the controlling lever being hinged with its first arm to the second end of the bar and with its second arm to a linkage of bars operatively connected to the louvres.

6. The apparatus according to claim 1, further comprising a device for adjusting the control of the operating mechanism according to ambient temperature conditions.

7. The apparatus according to claim 6, wherein the louvres are rotatably mounted adjacent to each other on a frame placed in front of the heat exchanger in the direction of the air flow, the frame being fixed substantially at the first end of the heat exchanger, said device being a two-armed controlling lever supported by a roller on a support attached to the second end of the heat exchanger, said device being a two-armed adjusting lever rotatably fixed by a bolt in the second end of the bar, wherein the controlling lever is hinged with its first arm to a first arm of the adjusting lever and with its second arm to the operating mechanism, and the adjusting lever is hinged with its second arm to the frame substantially at the second end of the heat exchanger.

8. The apparatus according to claim 1, wherein a controlling means for controlling the position of said louvres comprises a hydraulic servo device for controlling the position of the operating mechanism according to said displacement difference, the servo device being powered by a pressure difference of a medium to be cooled in the heat exchanger.

9. The apparatus according to claim 8, wherein the louvres are rotatably mounted adjacent to each other on a frame placed in front of the heat exchanger in the direction of the air flow, the frame being fixed substantially at the first end of the heat exchanger, wherein the hydraulic servo device is attached to the frame substantially at the second end of the heat exchanger and comprises a control valve and a piston device, the control valve controlling a flow of the medium from a higher pressure portion of the apparatus through the piston device and a throttle device via pipes to a lower pressure portion of the apparatus according to said displacement difference, the piston device having a piston rod connected to the operating mechanism.

10. The apparatus according to claim 1, wherein the louvres are rotatably mounted adjacent to each other on a frame placed in front of the heat exchanger in the direction of the air flow and the operating mechanism comprises a linkage of bars comprising an operating bar and rotating arms connected to the louvres.

11. The apparatus according to claim 10, wherein the linkage of bars further comprises a linkage head hinged to the operating bar, said linkage head comprising a slot for a bolt for allowing further displacement of the bolt in a direction corresponding to a closing of the louvres after the louvres have reached their closed end position.

12. The apparatus according to claim 11, wherein the frame comprises a limit stop for the linkage of bars to stop an opening of the louvres at an opened end position, and in the linkage head there is a spring support for the bolt for allowing further displacement thereof in a direction corresponding to the opening of the louvres after the louvres have reached their opened end position.

13. The apparatus according to claims 4, 5, 7 or 9, wherein the louvres are mounted on the frame in a way that their weight is operative in closing the louvres.

14. The apparatus according to claims 4, 5, 7 or 9, wherein the frame is made of steel.

15. An operating mechanism for adjusting a plurality of louvers in connection with a cooling apparatus having an air-cooled heat exchanger with first and second end portions and a plurality of tubes extending substantially between the first and second end portions, said tubes being made of a material having a predetermined thermal expansion coefficient, said operating mechanism comprising:
a bar having first and second end portions, said bar being made of a material having a thermal expansion coefficient substantially lower than said predetermined thermal expansion coefficient of said tubes;
said first end portion of said bar being secured to said first end portion of said heat exchanger, and said second end portion of said bar being associated with said second end portion of said heat exchanger such that the difference between the thermal expansion of said bar and that of said tubes helps to determine the position of said louvres.

16. The mechanism of claim 15, wherein the heat exchanger is made of aluminum and the bar is made of invar alloy.

17. The mechanism of claim 15, wherein said operating mechanism comprises a two-armed controlling lever rotatably fixed by a bolt in a support member attached to the second end portion of the heat exchanger, the controlling lever being hinged with its first arm to the second end portion of the bar and with its second arm to a linkage of bars operatively connected to the louvers.

18. The mechanism of claim 17, wherein the louvres are rotatably mounted adjacent to each other on a frame in spaced relationship with the heat exchanger, and wherein said linkage of bars comprises an operating bar and rotating arms connected to the louvres, wherein a linkage head is hinged to the operating bar and comprises a slot for a bolt for allowing further displacement of said bolt in a direction corresponding to a closing of the louvres after the louvres have reached their closed end position.

19. The mechanism of claim 18, wherein the frame comprises a limit stop for the linkage of bars to stop an opening of the louvres at an opened end position, and in the linkage head there is a spring support for the bolt for allowing further displacement thereof in a direction corresponding to the opening of the louvres after the louvres have reached their opened end position.

20. The mechanism of claim 15, wherein said tubes are finned tubes.

* * * * *